Figure 1:
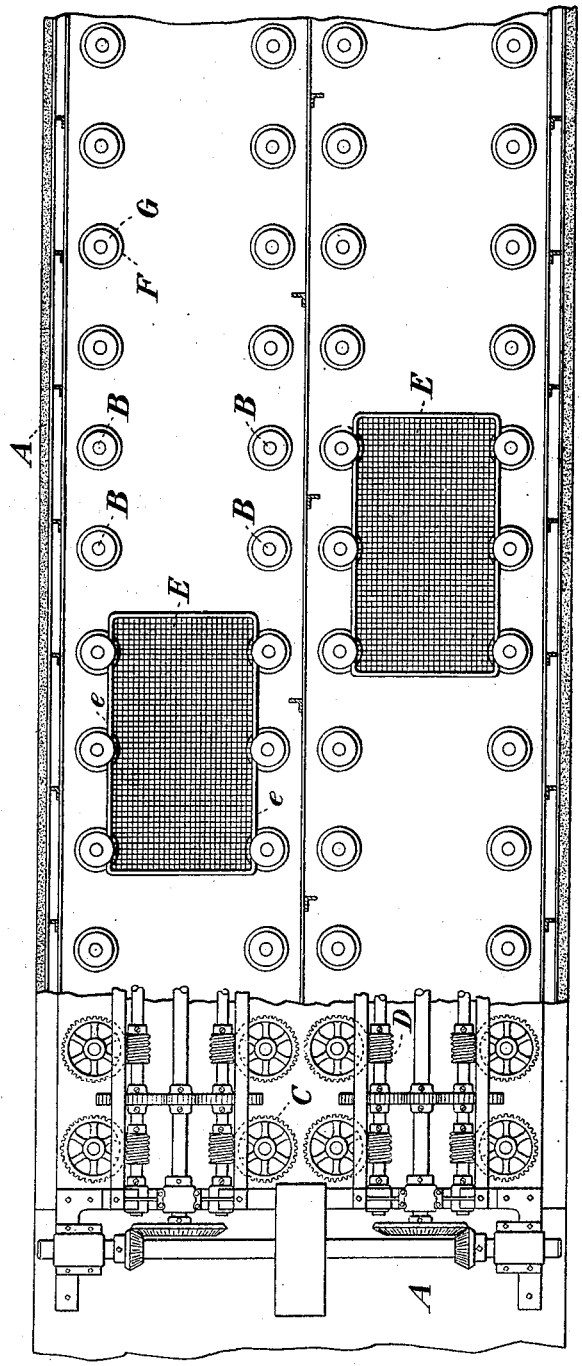

No. 746,145. PATENTED DEC. 8, 1903.
H. D. PERKY.
CONTINUOUS MOTION HEATING AND EVAPORATING APPARATUS.
APPLICATION FILED MAR. 5, 1901.
NO MODEL. 3 SHEETS—SHEET 1.

Witnesses
G. H. Hosmer.
E. O. Connell.

Inventor
Henry D. Perky
by E. W. Anderson
his Attorney.

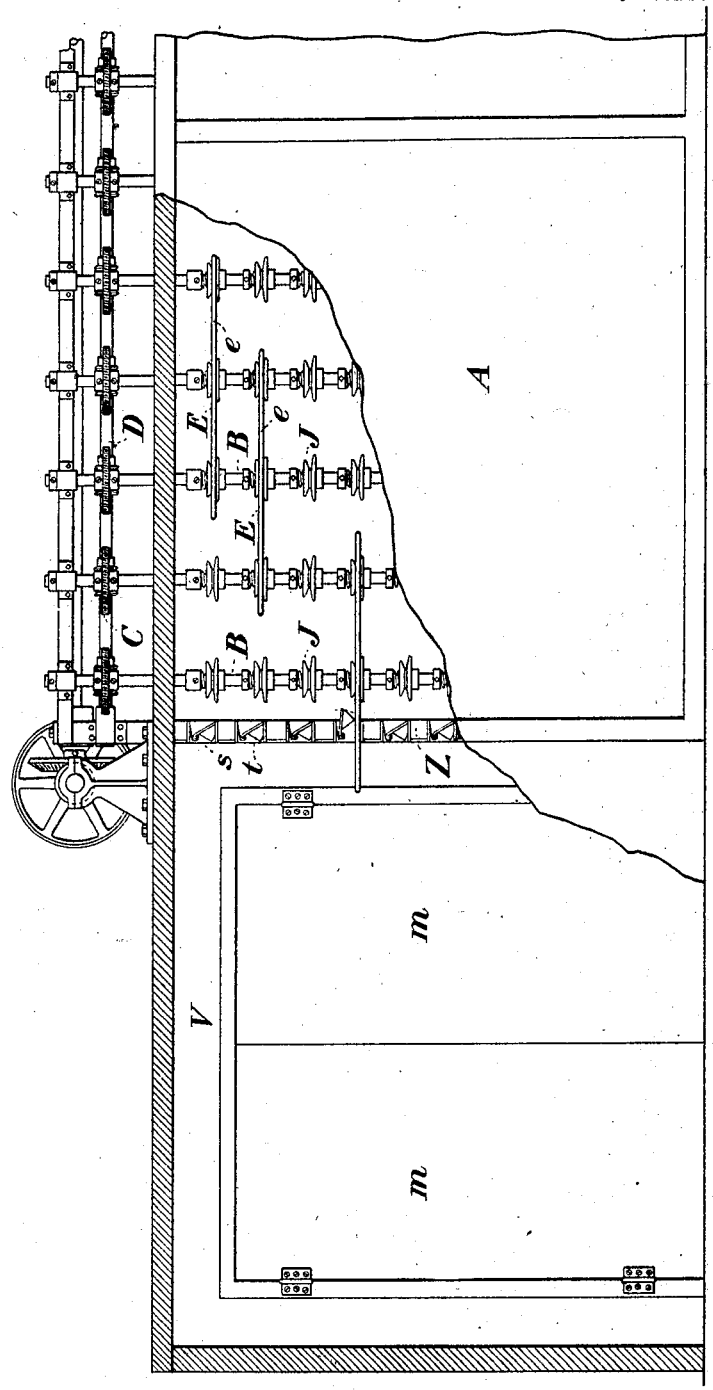

No. 746,145. PATENTED DEC. 8, 1903.
H. D. PERKY.
CONTINUOUS MOTION HEATING AND EVAPORATING APPARATUS.
APPLICATION FILED MAR. 5, 1901.
NO MODEL. 3 SHEETS—SHEET 3.
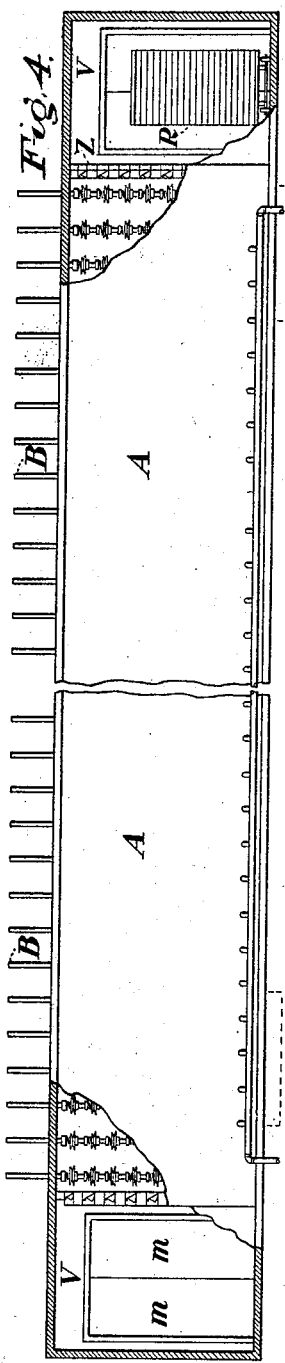
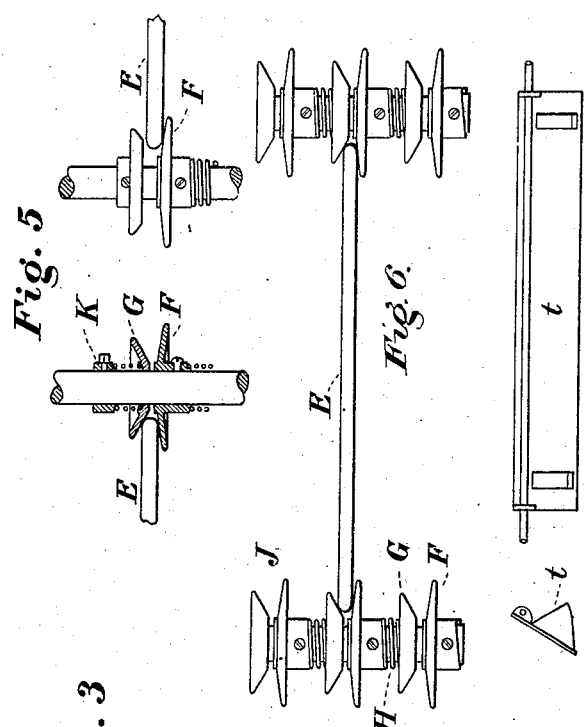
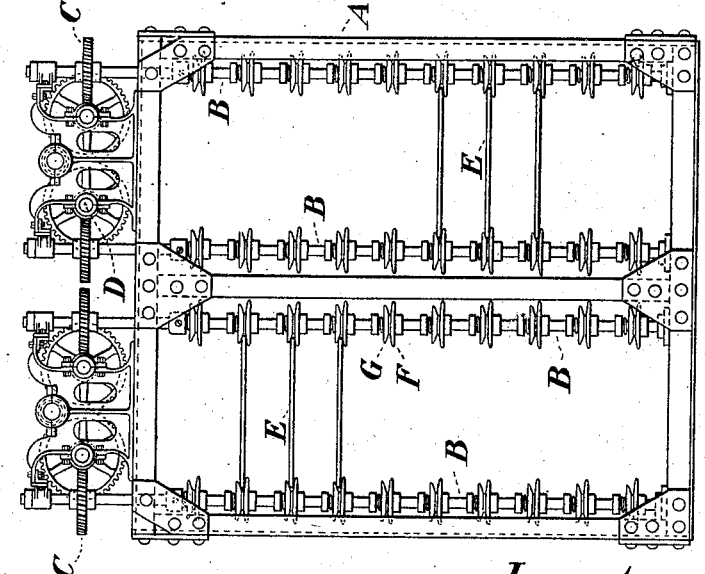
Witnesses
G. H. Hosmer.
E. O'Connell
Inventor
Henry D. Perky
by E. W. Anderson
his Attorney No. 746,145.

Patented December 8, 1903.

UNITED STATES PATENT OFFICE.

HENRY D. PERKY, OF NIAGARA FALLS, NEW YORK, ASSIGNOR TO THE NATURAL FOOD COMPANY, OF NIAGARA FALLS, NEW YORK, A CORPORATION OF NEW YORK.

CONTINUOUS-MOTION HEATING AND EVAPORATING APPARATUS.

SPECIFICATION forming part of Letters Patent No. 746,145, dated December 8, 1903.

Application filed March 5, 1901. Serial No. 49,883. (No model.)

*To all whom it may concern:*

Be it known that I, HENRY D. PERKY, a citizen of the United States, and a resident of Niagara Falls, in the county of Niagara and State of New York, have made a certain new and useful Invention in Continuous-Motion Heating and Evaporating Apparatus; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a plan view, partly broken away to show the interior mechanism. Fig. 2 is a side view, partly broken away to show the interior mechanism. Fig. 3 is an end view of the casing and mechanism, the end wall of the casing being removed. Fig. 4 is a side view, partly broken away, showing vestibules at the ends of the casing. Figs. 5, 6, and 7 represent details of the mechanism.

The invention has relation to means for heating or evaporating food products and other articles; and it consists in the novel construction and combinations of parts, as hereinafter set forth.

In the accompanying drawings the letter A designates the wall or incasement of the heating or drying chamber, which may be provided with steam-pipes or other ordinary means for effecting a temperature of the degree desired. In this chamber are arranged along its length parallel series of vertical shafts B B, the shafts of each series being placed opposite to each other, two and two, as indicated by the drawings. Each shaft is provided with a worm-wheel C, which is rigidly secured thereto and serves when operated by a suitable worm-shaft D, extending horizontally along the series, to cause a slow rotary motion. Usually a worm-shaft is provided for each line of vertical shafts B B, these being so constructed and arranged that all the vertical shafts will be turned at the same rate of speed, but in opposite directions, in each row or line from those in the next row or line. Instead of worm-gearing other means may be employed to turn the vertical shafts; but the worm-gearing is preferred.

E E represent plane pans or trays having their lateral edges $e\ e$ parallel and of sufficient thickness to afford purchase to the rotary grips or edge bearings J of the vertical shafts. All the pans or trays are of similar width, as they are designed to pass between the parallel rows of vertical shafts. These parallel-edge pans or trays are designed to have wire-cloth or foraminated bottoms extending in the plane of their parallel edges and in the plane of their respective edge bearings.

As usually constructed, on each shaft B is rigidly secured a circular flange or disk F, the upper surface of which is convex or in the form of an inverted saucer, and above this convex flange is provided on the same shaft a movable convex flange G, which, however, has its convexity downward in such wise that the convexities of the two flanges are toward each other. As usually arranged the convex surfaces of these flanges F and G are in contact at their central portions, or a thin washer may be placed between them. The upper flange G of each set is elastically pressed toward the lower or fixed flange by means of a spring, (indicated at H.) In this manner each shaft is provided with a rotary guide and vertical-pressure grip of elastic character adapted to engage the purchase edge $e$ of the pan or tray, hereinbefore referred to. Means of adjustment are usually provided for the spring, as indicated at K, whereby the force of the grip may be regulated in accordance with the requirements of the work. There may be several grip devices or edge bearings of like character on each shaft at different levels; but whatever be the number all the other shafts must have their grip devices on the same level or levels. The distance between any two shafts or grips in succession must be less than the length of a pan or tray and usually less that half its length unless auxiliary guides are provided to keep the trays in line with the grips, it being designed that before the engagement of a tray with one set of grips is terminated said tray shall in its forward movement become engaged with the next set of grips.

The worm-shafts are geared to give continuous rotary motion in opposite directions to the parallel rows of vertical shafts, so that the pans or trays will be carried along between them by the bearings in the same direction and in a continuous manner. The movement is designed to be slow in order to avoid great length of heating-chamber, as the drying or cooking operation must be completed when the tray arrives at the discharge end of the incasement. The action being continuous there is no waste of time in stopping for feeding or for the discharge.

At one end of the casing is usually provided a vestibule V, wherein communication is had with the feed end of the series of carrying devices, and in this vestibule is carried on the operation of feeding the charged pans or trays to the evaporator or baker, which is effected by passing them into engagement with the grips or edge bearings of the end shafts of the series. At the other end of the casing a similar vestibule is provided for the operator who takes the trays from the grips of this end after they have passed through the drying-chamber. Sometimes the vestibules may be dispensed with.

In the end walls of the heating-chamber or in the partitions Z are arranged slots or openings just sufficient for the passage of the trays and the articles thereon. The vestibules may be provided at their sides or outer ends with doors m in order to economize heat as much as possible. The charged trays may be loaded on racks R, and such racks may also be used in the discharging operation, the object being to avoid frequent openings of the vestibule-doors. In each slot s is usually provided a swinging shutter t, having lateral cam-flanges which are engaged by the edges of the pan and serve to open the shutter and hold it open until the pan of biscuit has passed through the slot. The shutters are thus opened and closed automatically and serve to prevent loss of heat from the closure.

The edge bearings of the vertical shafts are arranged in vertical series or in tiers, one above another, providing for moving tiers of pans, so that there is great economy of space in the apparatus

What I claim as my invention, and desire to secure by Letters Patent, is—

1. In heating apparatus, the parallel series of vertical shafts arranged in pairs, a vertical series of vertical-pressure grip devices arranged in pairs on said shafts, horizontal shafts extending along the series of vertical shafts, and the engagement-gearing of said horizontal shafts and vertical shafts, substantially as specified.

2. The combination with a heating or drying closure, of parallel series of vertical-pressure-spring grip devices, or edge bearings, oppositely placed in pairs and in tiers, one above another, and means for rotating said parallel series in opposite directions, substantially as specified.

3. The combination with a heating or drying closure, of parallel series of vertical shafts, the tiers of pairs of convex flanges secured thereto, the movable convex flanges thereon, the pressure-springs of the movable flanges, and the gearing arranged to turn the parallel series in opposite directions, substantially as specified.

4. The combination with a heating or drying closure, of parallel shafts, the moving edge bearings connected thereto, the gearing for turning the shafts, the parallel-edged pans or trays, and the automatic shutters of said closure, substantially as specified.

5. The combination with a heating or drying incasement, and closing devices at its end openings, of parallel series of tiers of pairs of moving vertical-pressure grip devices, or edge bearings, means for rotating said parallel series in opposite directions, and parallel-edge plane foraminated trays or pans adapted to engage said grip devices, substantially as specified.

6. In an oven or closure, the combination with the parallel-edge pans or trays of a plurality of series of vertical rotating shafts, tiers of pairs of opposite edge bearings on said shafts, spring devices to close said bearings on the edges of the pans or trays, gearing for turning said shafts, and automatically-closing devices for the feed and discharge ends of said oven or closure, substantially as specified.

In testimony whereof I affix my signature in presence of two witnesses.

HENRY D. PERKY.

Witnesses:
LEWIS C. MUZZY,
GEORGE H. HOSMER.